United States Patent Office
3,616,707
Patented Nov. 2, 1971

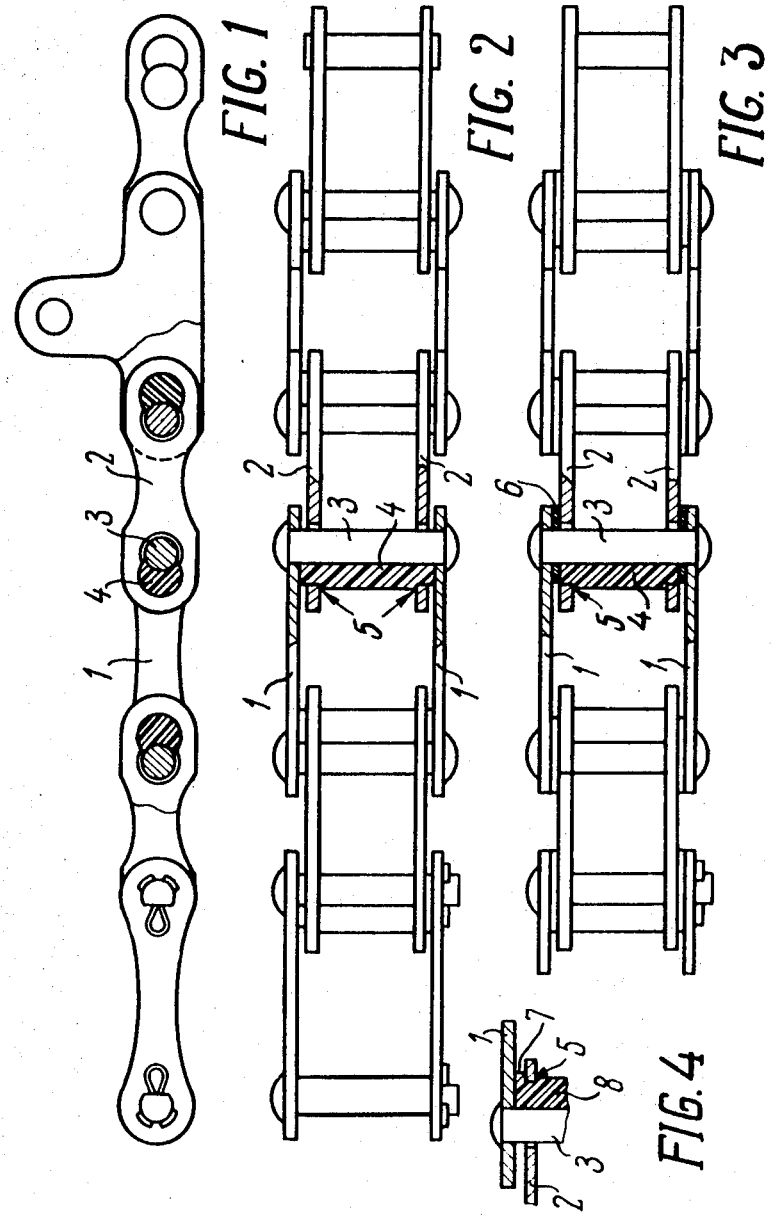

3,616,707
FLAT LINK CHAIN
Ilya Ilich Ivashkov, 9 Parkovaya, ulitsa 43/26, kv. 198, and Vasily Alexandrovich Frolovtsev, Ferganskaya ulitsa 18, kv. 263, both of Moscow, U.S.S.R.
Filed Jan. 2, 1970, Ser. No. 278
Int. Cl. F16g 13/02
U.S. Cl. 74—245 P                                    5 Claims

ABSTRACT OF THE DISCLOSURE

A flat-link chain, the hinge joints of whose links are formed by support member secured in the end portions of the plates and contacting one another with their outer working surfaces of which one is convex and the other one concave, in which chain the support members with a concave working surface are made from a polymeric material.

The proposed chain is highly reliable, durable and noise-less in operation when used with sprockets.

---

The present invention relates to the sphere of machine-building and, more particularly, to chain drives and designs of flat-link chains.

Known in the prior art are flat-link chains in which the hinge joints of the links are formed by support members secured at the end portions of the plates and contacting one another with their surfaces, one of said surfaces being convex and the other one concave (cf. U.S.S.R. Inventor's Certificate No. 187,461). In such chains the support members with a concave working surface are built into internal plates provided with openings for passage of the support members with a convex working surface, built into the external plates.

Unlike widely used hub and roller chains, such flat-link chains are less liable to the loss of hingeness when used in pulverous, corrosive and chemically active media.

However, under certain conditions, these known chains too becomes less movable in the hinges, mainly due to corrosion in the zone of contact between the external and internal plates, as well as in the zone of contact of the support members. In some cases the internal plates may displace along the support members with a concave working surface. The displacement of said plates toward the external plates results in deteriorated hinges, whereas the displacement thereof inside the chain may result in disengagement of the latter from the sprocket. Besides, all conventional chains are disadvantageous in that great additional dynamic loads appear in the course of their operation, said loads resulting from the fact that the sizes of the pitches of the chain links are not equal to the lengths of separate portions of the chain contour. These loads, which decrease the reliability of the chain operation, are the greater, the more rigid is the chain. Another disadvantage of all conventional chains lies in the great noise accompanying their operation due to collision of the support members with the teeth of the sprockets.

The present invention is aimed at the provision of such a flat-link chain in which the hinges would remain movable in the course of the chain operation and which would make it possible to minimize the dynamic loads and noise accompanying the chain operation with sprockets and, hence, to provide for more reliable and durable operation of the chain.

This object is accomplished by means of a flat-link chain, the hinge joints of whose links are formed by support members secured in the end portions of the plates and contacting one another with their outer working surfaces, one of said surfaces being convex and the other one concave, in which the support members with a concave working surface are made from a polymeric material.

It is expedient to provide the support members having a concave working surface with beads which prevent the chain plates secured thereon from displacing inside the chain.

The end portions of the support members with a concave working surface may protrude beyond the plates in which they are secured in such a manner that they allow no contact between the plates, and may be provided with spacer beads.

The chain plates may be separated one from another by washers made from a polymeric material and fitted onto the support members with a convex working surface.

The following description of an exemplary embodiment of the present invention is given with reference to the accompanying drawings, in which:

FIG. 1 shows a side, partially sectional view of the flat-link chain, according to the invention;

FIG. 2 shows a top, partially sectional view of the flat-link chain, according to the invention;

FIG. 3 shows a variant of the embodiment of the plate chain with washers, according to the invention;

FIG. 4 shows a variant of the embodiment of the support member with a concave working surface, according to the invention.

The flat-link chain consists of external plates 1 (FIG. 1), internal plates 2, support members 3 with a convex working surface and support members 4 with a concave working surface (here by the working surface is meant the portion of the support member surface with which it contacts another support member).

The support members 3 are stationarily fixed in the external plates 1 and loosely pass through openings made in the internal plates 2, whereas the support members 4 are stationarily fixed in the internal plates 2.

The support members 3 and 4, forming the hinge joints of the links, may turn freely relative one another, remaining, at the same time, stationary relative to the plates in which they are secured.

The support members 4 with a concave working surface are made from a polymeric material and are provided with beads 5 (FIG. 2) preventing the internal plates 2 from displacing along the support members 4 inside the chain. The end portions of the members 4 protrude beyond the plates 2, which allows no contact between the plates 2 and 1.

In the variant of the embodiment of the plate chain, as shown in FIG. 3, the plates 1 and 2 are separated one from another by a polymer washer 6 fitted onto the support member 3.

The plates 1 and 2 may be also separated by means of a bead 7 (FIG. 4), which in this variant of the embodiment of the chain constitutes an integral part of the support member 8 with a concave working surface.

The proposed chain may be made single-row and multi-row, with straight and bent plates, as well as a driven and traction one (a conveyor one, provided with a special joining device).

The fact that in the proposed flat-link chain one of the support members of the hinge joint is made from a polymeric material and the plates of the chain are separated one from another, enables the hinge joint to be maximum movable when used in corrosive and chemically active media.

The provision of the support members 4 with the beads 5, which prevent the internal plates 2 from displacing inside the chain upon disturbance of fitting of the support members 4 in the plates 2, substantially raises the reliability of the chain without increasing, at the same time, the cost of the chain manufacture, for the labour consumption and cost of manufacture of a chain whose polymer support members are provided with the beads will be approximately the same as those of a chain whose polymer support members have no beads.

As compared to a chain in which the support members are made from metal, the chain in which the support members are made from a polymer has a substantially greater rigidity, which decreases the dynamic loads resulting from the difference in the pitches of the links and lengths of separate portions of the chain contour, as well as the noise accompanying the operation of a chain employing sprockets (which in certain cases is of extreme importance), and the weight of the chain.

All this, taken together, makes the chain reliable, durable and convenient in operation.

What is claimed is:

1. A flat-link chain comprising: plates; hinge joints of said plates; support members with an outer convex working surface; support members with an outer concave working surface, made from a polymer; said support members contacting one another with said working surfaces, thus forming said hinge joint.

2. A flat-link chain according to claim 1, in which said support members with a concave working surface are provided with beads preventing the plates secured thereon from displacing inside the chain.

3. A flat-link chain according to claim 1, in which the end portions of said support members with a concave working surface protrude beyond said plates, in which they are secured, in such a manner that they allow no contact between said plates.

4. A flat-link chain according to claim 3, in which said end portions of said support members with a concave working surface, protruding beyond said plates, are provided with spacer beads.

5. A plate chain according to claim 1, in which said plates are separated one from another by washers made from a polymer and fitted onto said support members with a convex working surface.

References Cited

UNITED STATES PATENTS

| | | | |
|---|---|---|---|
| 3,234,807 | 2/1966 | Morin | 74—245 P |
| 3,359,814 | 12/1967 | Kummerer et al. | 74—245 R |

LEONARD H. GERIN, Primary Examiner

U.S. Cl. X.R.

74—245 LP